United States Patent [19]
Lazzaro

[11] 3,875,106
[45] Apr. 1, 1975

[54] ABLATION COMPOSITIONS AND COATINGS

[75] Inventor: Vito C. Lazzaro, Los Angeles, Calif.

[73] Assignee: McDonnell Douglas Corporation, Santa Monica, Calif.

[22] Filed: Oct. 30, 1970

[21] Appl. No.: 85,800

Related U.S. Application Data

[63] Continuation of Ser. No. 585,563, Oct. 10, 1966, abandoned.

[52] U.S. Cl....... 260/37 EP, 106/15 FP, 260/37 N, 260/DIG. 24
[51] Int. Cl............................................. C08g 51/10
[58] Field of Search....... 106/15 FP, 41; 260/37 EP, 260/DIG. 24

[56] References Cited
UNITED STATES PATENTS

| | | | |
|---|---|---|---|
| 3,115,271 | 12/1963 | Anderson et al............... | 260/37 EP |
| 3,187,503 | 6/1965 | Taylor................................ | 260/38 |
| 3,317,455 | 5/1967 | Blome et al........................ | 106/288 |

OTHER PUBLICATIONS

Encyclopedia of Polymer Sci. & Techn., Vol. 1 (Interscience), (N.Y.), (1964), pages 1–7. TP 156 P6 E5.
Modern Plastics Encyclopedia, 1965 (McGraw-Hill), (N.Y.), (Sept, 1964), page 181. TP 986 A2 M5.
Mellor–Inorganic & Theoretical Chem., Vol. 5 (Longmans, Green), (N.Y.), (1946), pages 79–81. QD 31, M4.

*Primary Examiner*—Donald E. Czaja
*Assistant Examiner*—H. H. Fletcher
*Attorney, Agent, or Firm*—Max Geldin

[57] ABSTRACT

Ablative composition and coating comprising silica, preferably silica fibers, a boron and oxygen-containing compound such as boron oxide, and a char-forming resin such as an epoxy resin. Such ablative composition is capable of application to a substrate by spraying, troweling, and the like.

13 Claims, 3 Drawing Figures

VITO C. LAZZARO

ATTORNEY

ABLATION COMPOSITIONS AND COATINGS

This application is a continuation of U.S. application Ser. No. 585,563, filed Oct. 10, 1966, now abandoned.

This invention relates to novel ablation compositions and coatings having high ablative effectiveness, and is particularly concerned with ablation compositions and coatings containing a resinous material in combination with high melting siliceous materials, which form a coherent char layer when subjected to high temperatures, such compositions being capable of application to a substrate in any desired coating thickness, e.g., by brushing or spraying the composition unto the surface of such substrate.

High temperature heat insulating and ablative structures and coatings have assumed considerable importance in the development of high speed aircraft and the like, for protection of structural elements exposed to extremely high temperatures. An important criterion is that the ablative coating ablate uniformly and maintain its structural integrity during ablation and exposure to extremely high temperatures, e.g., when subjected to ablation gases having a velocity of the order of Mach 2 and a temperature, e.g., in the range of from about 3,600° to about 3,800°F.

Various types of materials have been employed as ablative or ablation coatings, such as phenolics and nylon, for example, in the form of nylon sheets. Such nylon sheets, cloth or tape impregnated with a phenolic resin have been employed by wrapping around the object to be covered and protected, to form an ablative material, that is, a thermally destructive and sacrificial type material, and the so-wrapped sheets are subjected to curing under heat and pressure.

However, in many instances, for example, where only a thin coating of the ablation material is desired, or the object to be covered with the ablation material has a complex configuration or irregular surface, it has been found impractical and also expensive to wrap resin impregnated sheets, cloth or tape, e.g., phenolic impregnated nylon sheets, around the object to be covered.

Ablation type resinous coating compositions have been produced, but such compositions often are difficult to apply to a substrate, e.g., as by spraying where only a thin coating is desired, and often such compositions lack the ablative effectiveness required to properly protect the interior of an object being protected by such ablation coating, at particularly high temperatures and under high shear stress.

A particular defect of prior art ablation compositions and coatings resides in the fact that in many instances the char layer resulting from decomposition of the resin at high temperatures, rapidly disintegrates and is eroded away from the surface desired to be protected, and the structural integrity of the ablative coating or structure rapidly deteriorates. This phenomenon seriously reduces the effective protection provided by the ablation coating when the coated object is subjected to ablation conditions at high temperatures. It is accordingly desirable to provide an ablation composition and coating such that upon charring of the resinous base material during the ablation period, the char layer is maintained substantially intact adjacent the surface of the substrate or the object being protected, thus providing effective heat insulation and protection of such substrate or object under ablation conditions.

Various attempts have been made in the prior art to provide an ablative material having the above noted advantageous characteristics. However, in certain instances cumbersome and relatively expensive systems have been developed and in many instances the ablative coatings and compositions provided have not been sufficiently effective. Thus, for example, in U.S. Pat. No. 3,210,233 to Kummer et al., an ablative material is disclosed in the form of a non-metallic honeycomb matrix having an insulating and ablative material filled into the cells of the honeycomb. The honeycomb is intended to provide support for the char layer formed during ablation. However, this system requires the utilization of a honeycomb matrix, and necessitates the filling of the cells of the matrix with a material such as a resin. U.S. Pat. No. 2,835,107 to Ward discloses a high temperature resisting system composed of a mixture of a thermosetting resin and asbestos fibers. In U.S. Pat. No. 2,992,960 to Leeg et al., there is disclosed an article or laminate having high temperature strength characteristics when heated to temperatures of at least 1,300°F comprising an organic resinous material, a refractory filler and elemental boron dispersed therein. However, it has been found that the systems of Ward and Leeg et al. do not possess sufficiently high ablative effectiveness.

It is accordingly a chief object of the invention to provide ablative or ablation coatings and compositions containing a resin and a high fusing inorganic, e.g., siliceous material, which have high ablative effectiveness a high which upon subjection to ablation at high temperatures, form a char layer which is maintained substantially in contact with the substrate to which it is applied, and providing effective insulation and protection of the coated substrate or object.

A further object is the provision of improved ablation compositions and systems of the above type which are relatively inexpensive and which can be readily applied to a substrate substantially to any desired thickness of coating, by various means, including spraying, to form an ablative coating having the above noted advantageous characteristics.

It has been found according to the invention that by incorporating silica, e.g., as silica fibers, and a boron and oxygen-containing material or compound such as boron oxide into a resin system such as an epoxy system, there is provided a highly efficient ablative coating composition. It has been found that the ablative effectiveness of such composition is markedly superior to a similar composition in the absence of such silica material, or to a similar composition in the absence of such boron-containing compound. It has also been found that such improved ablation compositions including both silica and a boron and oxygen-containing compound can be designed in the form of sprayable compositions which can be readily applied to a substrate, e.g., in the form of a very thin but effective coating.

It is believed that the combination of the silica, or preferably silica fibers, and boron oxide, or a boron compound which contains boron and oxygen in its molecule, certain of which generally decompose to boron oxide upon heating, such as ammonium borate, boric acid, and the like, when heated, causes a melting of the boron compound or boron oxide which fuses the silica or silica fibers and forms a net which holds the char layer formed by combustion of the resin, coherent and in position against the substrate surface, and substantially reduces further deterioration of the layers beneath. This results in effective insulation and protection of the substrate or the object coated with such ablation composition, during the period of subjection to high temperatures and ablation conditions. Without the boron oxide or equivalent boron compound in conjunction with the silica or silica fibers, this phenomenon does not occur, and the char layer formed by destruction of the resin at high temperatures rapidly disintegrates and is discharged from the substrate surface by the high velocity ablation gases, leaving the substrate layers beneath unprotected. However, it is understood that the invention is not to be taken as limited by any theory of the function of the ablation composition and coating for obtaining the improved results hereof.

The invention is applicable to various types of resin systems, preferably strong char forming organic resins, including but not limited to, epoxy resins, phenolics, phenolic-epoxies, silicone resins, urea-formaldehyde, melamines, and the like. The phenolics, epoxies and silicones are preferred.

The epoxy resins can be either a single type of epoxy having a plurality of epoxide groups, or a mixture of two or more different epoxies provided that at least one of the epoxy reactants has a plurality of epoxide groups. Some suitable epoxies are epoxidized polyolefin, epoxidized soybean oil, bis-(2,3-epoxycyclopentyl) ether, vinylcyclohexene dioxide, dicyclopentadiene dioxide, butadiene dioxide, diglycidyl ether of butanediol, diglycidyl ether of bisphenol A, diglycidyl ether of tetrachlorobisphenol A, diglycidyl ether of resorcinol, diglycidyl ester of dimeric linoleic acid, triglycidyl ether of glycerol, polyglycidyl ethers of glycol, diglycerol, mannitol, and the like.

Preferred epoxies comprise the glycidyl ethers such as the glycidyl ethers of the phenols, and particularly those prepared by reacting a dihydric phenol with epichlorhydrin, e.g., the diglycidyl ether of bisphenol A; and the epoxy novolac resins, which are phenolic epoxies, e.g., those marketed under the designation DEN by Dow Chemical Company.

Thermosetting phenolic resins which can be employed include phenol-formaldehyde, phenol-acetaldehyde, phenol-furfural, m-cresol formaldehyde, and resorcinol-formaldehyde resins. Other thermosetting resins include urea-formaldehyde, melamine-formaldehyde and the like.

The silicone polymers or resins which can be employed include methyl siloxane polymers and mixed methyl phenyl siloxane polymers, e.g., polymers of dimethyl siloxane, polymers of phenylmethylsiloxane, copolymers or phenylmethylsiloxane and dimethylsiloxane, and copolymers of diphenylsiloxane and dimethylsiloxane.

Any high temperature silica-containing material can be employed for incorporation in the resin, and such material can be in either the powder or the fiber form, but is preferably in fiber form to obtain high ablative effectiveness. Thus, for example, there can be employed quartz, flint, borosilica, and the like. It is preferred to employ high purity silica such as quartz or the synthetically produced leached high silica fiber glass marketed as Refrasil, and believed to have a silica content of the order of 96% or higher, e.g., 98–99% silica. Other similar high purity silica fibers such as those marketed as Sil-Temp and Astrosil are also highly suitable. Thus, for example, high silica fibers such as Refrasil, Sil-Temp or Astrosil can be utilized, the fibers of such materials being from 1/32 inch to 2 inches, preferably about 1/32 inch to about 1 inch, in length.

Any boron compound can be employed in combination with the resin and silica materials, which contains boron and oxygen in the molecule. At high temperatures, generally certain of such compounds are decomposable and convertible to boron oxide. Thus, for example, there can be employed boron oxide, borates such as the alkali metal, e.g., sodium or potassium borates or ammonium borates, and complex or organic borates such as butyl borates, phenyl borates and the like, and boric acid. All of the above noted boron compounds suitable for purposes of the invention and which contain boron and oxygen in the molecule are considered to contain boron oxide. Applicant has found that the use of elemental boron, as described in Leeg et al., U.S. Pat. No. 2,992,960, in place of a boron compound as described above, in the invention system, is essentially ineffective for producing improved ablative results according to the invention, as demonstrated hereinafter.

The resin component, e.g., epoxy or phenolic, can be employed in proportions as low as about 15% and up to about 95%, preferably about 25% to about 75%, by weight of the composition.

The silica component, e.g., silica fibers, can be employed in amounts as low as about 1% and as high as about 80%, preferably from about 5% to about 75% by weight of the composition.

The above noted boron compounds suitable for use in the invention composition can be employed in amounts as low as about 0.1% and up to about 25%, preferably from about 1% to about 10%, calculated as boron oxide, by weight of the composition. The amount of such boron compound, e.g., boron oxide, employed depends in large measure on how much fusion of the silica fibers by the boron compound or the boron oxide present or which is formed on heating, is desired in order to form the above net-like retaining layer which holds the char layer in place during ablation.

In some instances, the major component of the composition can be the resin component, for example, in an epoxy system using say between about 50% and about 75% epoxy, and in some systems, for example, a phenolic system, the silica can be employed in major proportions, e.g., about 50% to about 75%.

The ablation compositions of the invention can also contain various optional components. Thus, for example, the composition can, but need not necessarily, contain fire retardant materials such as phosphates, e.g., in the form of alkali metal phosphates, such as sodium or potassium phosphates, and ammonium phosphates; antimonates, in the form of their alkali metal, e.g., sodium salts, and ammonium salts, and the like. Such fire retardant materials can be employed in amounts of about 5 to about 25% by weight of the composition.

As a further feature of the invention, it has been found desirable when employing the boron compound in the form of salts such as the borates, and also phosphates in the invention composition, to use those salts which are alkali free, for example, by using the ammonium salts of these materials such as ammonium borate and ammonium phosphates. This is particularly important where the ablative coating is required to have a very low alkali content, e.g., less than 50 parts per million and which under these conditions is considered to be substantially alkali free.

Where the boron compound and other salts employed, e.g., phosphates, are in the form of the preferred ammonium salts of these materials, such as ammonium borate or ammonium phosphate, an additional advantage is provided in that during ablation ammonia gas is evolved and such gas passes through the resin char layer providing a transpirational cooling effect which further increases ablative effectiveness.

Although it is preferred not to have a silicate type material such as asbestos present in the composition, in some instances where the alkali content can be tolerated, high melting silicates, e.g., in the form of asbestos (magnesium silicates), S-994 glass (aluminum and magnesium silicate), and E-glass, for example, can be employed, in amounts from about 0.1% to about 10% by weight of the composition.

In compounding the ablation coating composition of the invention, the silica, e.g., silica fibers, boron compound such as boron oxide or ammonium borate, and other optional components such as phosphates, e.g., ammonium phosphate, are mixed and incorporated in suitable proportions noted above, with the resin base component such as an epoxy. Preferably, at or about the time of application of the coating composition to a substrate to be protected, there is incorporated into the coating composition a suitable curing agent for the resin component. Such curing agents in the case of some resin systems such as epoxies can effect a cure at ambient temperature, or the curing agent may be of a nature, e.g., in the case of both phenolic and epoxy systems, to produce a cure only at elevated temperatures. In the case of epoxy resins, suitable curing agents include polyamines such as p-phenylene-diamine, diethylene triamine, and polyamides such as the material marketed as Versamid. Room temperature epoxy curing agents such as aminophenol curing agents can also be employed. Such a curing agent is tris (dimethylamino methyl) phenol marketed as DMP-30.

Curing agents for the phenolic resins include, for example, alkaline catalysts such as sodium carbonate, or acid catalysts. Epoxy-novolac resins can be cured by alkaline catalysts or with hexamethylenetetramine.

In the case of silicone resins employed in the invention composition, there can be employed curing agents such as benzoyl peroxide.

The ablation coating compositions of the invention can be coated or can be sprayed, for example, the composition can be applied as a coating by doctor blade or troweling unto a substrate or the surface of an object to be protected by the ablative coating. If a sprayable material is desired, depending on the particular resin system, e.g., as to viscosity, a thinner or solvent can be used, particularly in the case of ambient temperature curing material such as an epoxy system employing a room temperature curing agent. For this purpose, organic solvents such as a ketone, e.g., methylethyl ketone or acetone, or aromatic solvents such as toluene or xylene, can be used, particularly with epoxy, phenolic and silicone systems. However, particularly where silica fibers are employed, depending on the viscosity, it has been found that some resin systems such as epoxy systems incorporating such silica fibers and the boron compound according to the invention can be sprayed without any solvent. Where a solvent is employed, the amount of solvent used can range from about 1 to about 100 parts, or more, per 100 parts of solids.

Any suitable substrate or surface can be coated with the ablation composition of the invention. Thus, for example, metal surfaces such as steel or steel alloy or other metal or metal alloy surfaces such as Inconel, aluminum and its alloys, and the like, can be employed as substrate, as well as other materials such as ceramics, and the like.

Following application of the ablation coating to the substrate to be protected, the coating is subjected to curing. As previously noted, in the case of a resin system such as an epoxy system, such curing can take place at room temperature employing a room temperature catalyst. However, in the other resin systems heating of the coating is required to effect a suitable cure. In the case of phenolics, both heat and pressure are generally required to effect the desired cured ablation coating.

Instead of mixing the silica, e.g., silica fibers, and the boron compound such as boron oxide as separate components with the resin component of the composition, it has been found that, for example, silica fibers can be coated with a film or layer of the boron compound which has been deposited thereon from an aqueous solution, e.g., of boric acid or ammonium borate, or by means of melted boron oxide. These fibers containing the coating of boron compound can then be incorporated into the resin, e.g., epoxy or phenolic resin.

Also, if desired, the resin system, e.g., epoxy resin containing silica, e.g., in the form of silica fibers, and other optional components such as phosphates can be applied to the surface of a substrate, and a suitable boron compound such as boron oxide can be distributed as by dusting over the surface of the initially applied coating, followed by curing thereof. Alternatively, the resin-silica system can be formed as a base layer on the substrate to be protected, with a top layer of a mixture of boron compound, silica and resin, according to the invention, applied over the initial layer.

When the substrate or object coated with the cured ablation coating of the invention is subjected to high temperatures, as previously noted, charring of the resin first occurs and a fusion of the boron compound or boron oxide component of the composition which is initially present or which forms on heating the boron compound, is then believed to occur, which fuses the silica, preferably the silica fibers, together and forms a net over the charred resin coating or char layer. Such fusion temperature in the case of boron oxide is of the order of about 860°F. Upon subjecting the coated object to ablation conditions at high temperatures, the silica net formed by the boron compound or boron oxide fusion maintains such char layer in position against the substrate and forming a protective layer which resists transfer of the heat of ablation to the opposite side of the substrate, and which is prevented from being eroded away by the high velocity ablation gases. As previously noted, in the absence of such boron oxide or equivalent boron compound according to the invention, in the composition in conjunction with the silica or silica fibers, such net-like protective shield over the char layer is not provided, and the char layer is rapidly eroded away leaving the substrate beneath unprotected and substantially raising the temperature of the opposite wall of the substrate.

The invention is further illustrated in the accompanying drawing wherein.

Figure 1:
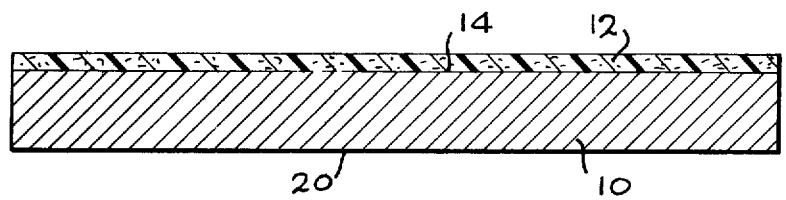
FIG. 1 shows a substrate whose surface is coated with the ablative coating composition of the invention.
Figure 2:
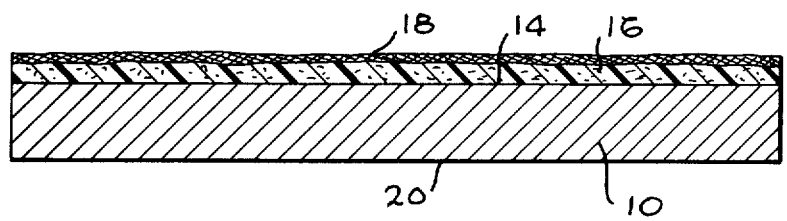
FIG. 2 shows a char layer with a protective net formed during ablation of the coated substrate of FIG. 1.

Thus, FIG. 1 shows a substrate 10 having an ablation coating according to the invention and illustrated at 12, applied to the surface 14 thereof. During ablation, as illustrated in FIG. 2, the resin component is transformed into a char layer 16 over which is disposed the protective net 18 formed by fusion of the silica fibers by the boron compound or oxide as noted above. This maintains the char layer 16 in place to protect the substrate 10 and provides a cool inner wall 20 of such substrate.

Figure 3:
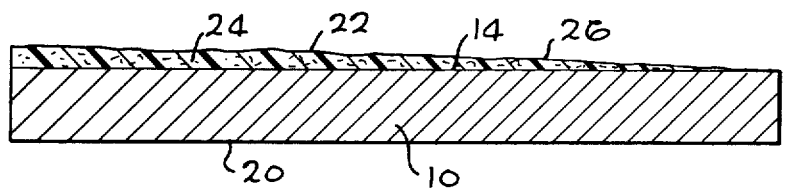
FIG. 3 shows a substrate whose surface is coated with a conventional ablation coating composition which does not form a protective net.

In FIG. 3 employing a conventional prior art ablation coating, during the ablation period when the ablation coating is subjected to high temperatures causing decomposition of the resin base, a protective net such as 18 in FIG. 2, is not formed and the surface 22 of the char layer 24 in FIG. 2 is unprotected and is eroded away as indicated at 26 by the high velocity high temperature ablation gases, leaving the adjacent surface 14 of the substrate essentially unprotected to thereby substantially raise the temperature of the opposite wall 20 of the substrate.

It will be understood that the showings in the drawing are exaggerated for purposes of greater clarity.

The following are examples of practice of the invention.

In the following examples, steel plates were used as substrates, such plates being 1¼ inch in width, 6½ inches long and 1/16 inch thick. The ablative coating composition was applied to one surface of the plates, forming a ¼ inch thick coating. Following application of the coating, the coating was cured at a suitable temperature.

For testing purposes, a pebble bed heater was employed and air was blown through the bed and through a discharge nozzle at a velocity of approximately Mach 2 and at a temperature of between about 3,600° and 3,800°F. The steel test specimens containing the respective ablative coatings were placed in approximately 10° inclination to the vertical and about ⅛ inch from the lower end of the air discharge nozzle. The air jet was applied for a period ranging from about 6 seconds to about 20 seconds.

The cold wall ablative effectiveness Q* is the value in BTU/lb., measured as the product of the heat flux and exposure time divided by the product of the density of the material and the ablative depth. The higher the value of Q*, the greater the ablative effectiveness.

EXAMPLE 1

The following compositions after curing were each tested for ablative effectiveness in the manner described above, and their respective Q* values are set forth below. The period of ablation was 6 seconds for the specimens coated with Compositions A, B, C, D and G. For those specimens coated with Compositions E and F, the ablation time was 12 seconds.

| | Compositions | Ablative Effectiveness Q* |
|---|---|---|
| A | 10% Refrasil, 1/32" fiber<br>90% epoxy-polyamide | 1125 |
| B | 20% Refrasil, 1/32" fiber<br>80% epoxy-polyamide | 1090 |
| C | 30% Refrasil, 1/32" fiber<br>70% epoxy-polyamide | 1025 |
| D | 10% Refrasil, 1/32" fiber<br>2% elemental boron<br>88% epoxy-polyamide | 1250 |
| E | 10% Refrasil, 1/32" fiber<br>10% ammonium borate<br>80% epoxy-polyamide | 2265 |
| F | 10% Refrasil, 1/32" fiber<br>10% ammonium borate<br>10% ammonium phosphate<br>70% epoxy-polyamide | 2240 |
| G | 10% Refrasil, 1/32" fiber<br>10% ammonium phosphate<br>80% epoxy-polyamide | 1120 |

The term "Refrasil" employed in the compositions above is a leached high silica fiber glass believed to contain 98 to 99% silica and marketed by HITCO (formerly H. I. Thompson Fiberglass Company), the epoxy employed is marketed as U.C. 2744 by Union Carbide Company, believed to be a condensation product of bisphenol A and epichlorhydrin, and the polyamide is the curing agent for the epoxy, and marketed as Versamid-140. The epoxy-polyamide portion of each of the above compositions was composed of 62% of the epoxy and 38% of the polyamide.

It is noted from Compositions A, B and C above that coating compositions containing only epoxy resin and Refrasil had ablative effectiveness values Q* ranging from about 1,000 to somewhat above 1,100. On the other hand, Composition E according to the invention including 10% ammonium borate in the epoxy system containing Refrasil fibers, showed a markedly increased Q* value of 2,265. Composition D, however, containing 2% elemental boron and which is approximately equivalent to the boron content of the ammonium borate of the invention Composition E, only showed a Q* value of 1,250, and although somewhat improved over Compositions A, B and C containing no boron at all, was greatly inferior to Composition E of the invention employing a boron compound, namely ammonium borate.

In Composition F above, differing from Composition E in the inclusion of 10% ammonium phosphate in place of an equivalent amount of the epoxy, the ablative effectiveness was substantially the same as that for Composition E, and in Composition G, differing from Composition A similarly in the incorporation of 10% ammonium phosphate in place of an equivalent amount of epoxy, there was essentially no improvement in ablative effectiveness over Composition A. This indicates that ammonium phosphate has substantially no effect on ablative effectiveness. As previously noted, however, the incorporation of ammonium phosphate improves the fire retarding of fire resisting properties of the composition.

EXAMPLE 2

Results similar to those of Example 1 are obtained when employing in place of ammonium borate in Compositions E and F of the invention, an equivalent amount of boron oxide ($B_2O_3$), specifically about 7% boron oxide, in place of the 10% ammonium borate, and increasing the amount of epoxy-polyamide component of Compositions E and F to 83% and 73%, respectively.

EXAMPLE 3

Test specimens were prepared as described above employing Compositions H, I, J and K noted below on respective steel plates, and such coated specimens cured and subjected to ablation tests as described above for a period of duration of about 12 seconds each. The ablation coating compositions tested and the ablative effectiveness Q* for the respective coatings are noted below. In each of the formulations below, the polyamide curing agent employed was Versamid–140 and the epoxy resin was the bisphenol A-epichlorhydrin reaction product, employing a ratio of 35% epoxy and 65% polyamide in the epoxy-polyamide resin system.

The epoxy resin-polyamide component of each of these formulations contained about 65% polyamide curing agent, and 35% epoxy resin, the epoxy resin being the diglycidyl ether of bisphenol A and the polyamide being the curing agent marketed as Versamid–140.

Compositions L, M, N and O were incorporated in methyl ethyl ketone, in a proportion of about 30% solvent and 70% solids by weight. Such compositions were in sprayable form and were sprayed onto the substrate surfaces. Compositions P, R and S contained no solvent and were each cast on their respective substrate surfaces. The coatings were each cured at room temperature.

Each of the above noted test specimens coated with the respective cured Compositions L to S was subjected to ablation conditions as described above, Compositions L, M, N and O being subjected to such ablation for a period of about 12 seconds each, and the cured coatings formed from Compositions P, R and S being subjected to such ablation each for a period of about 20 seconds. The respective Compositions L to S and the ablative effectiveness Q* of each of such compositions are set forth below:

|  | L | M | N | O | P | R | S |
|---|---|---|---|---|---|---|---|
|  |  |  | Compositions (% by weight) |  |  |  |  |
| Epoxy resin-polyamide | 65 | 67 | 70 | 73.4 | 72 | 68.4 | 64.5 |
| Asbestos | 15 | 10.8 | 5.7 | — | — | — | — |
| Ammonium borate trihydrate | 10 | 10.5 | 11 | 11.5 | 11.5 | 10.8 | 10.25 |
| Phosphate fire retardant | 10 | 10.5 | 11 | 11.5 | 11.5 | 10.8 | 10.25 |
| Refrasil (¼" fibers) | — | 1.2 | 2.3 | 3.6 | 5 | 10 | — |
| Refrasil (1/32" fibers) | — | — | — | — | — | — | 15 |
|  | 100 | 100 | 100 | 100 | 100 | 100 | 100 |
| Q* (BTU/lb.) | 2,345 | 4,500 | 5,310 | 5,580 | 6,900 | 9,700 | 17,000 |

| Compositions | | % by Weight | Q* |
|---|---|---|---|
| H | Epoxy-polyamide resin | 65 | 1930 |
|  | Asbestos | 15 |  |
|  | Sodium borate hydrate | 10 |  |
|  | Phosphate fire retardant | 10 |  |
|  |  | Parts by Weight |  |
| I | Composition H | 100 | 2180 |
|  | E glass (½" fibers) | 5 |  |
| J | Composition H | 100 | 3150 |
|  | Refrasil (¼" fibers) | 5 |  |
| K | Composition H | 100 | 2450 |
|  | S-994 glass (½" fibers) | 5 |  |

From the results noted above, it is seen that Compositions I and K incorporating a minor amount, 5 parts, of E glass fibers and of S–994 glass fibers (both silicates), respectively, into 100 parts of Composition H containing epoxy resin, asbestos and sodium borate, provide a relatively minor improvement in ablative effectiveness over Composition H. On the other hand, Composition J incorporating 5 parts of high silica fibers (Refrasil) into 100 parts of Composition H substantially improves the ablative effectiveness of Composition H, which contains only asbestos (a silicate) and no silica.

EXAMPLE 4

Steel plates or substrates as noted above were each coated with the respective Compositions L to S noted below.

From the data set forth above, it is seen that with about 10 to about 11.5% of the ammonium borate component in each of the epxoy resin compositions, where the composition contained only 1.2% high silica fibers (Refrasil) and 10.8% asbestos, Composition M, the ablative effectiveness Q* was 4,500, markedly superior to the ablative effectiveness of 2,345 for Composition L containing 15% asbestos but no Refrasil.

This improvement resulting from the incorporation of Refrasil was increased still further using larger proportions of Refrasil of 2.3% in Composition N with 5.7% asbestos, to provide a Q* value of about 5,300.

When the asbestos was completely substituted by the silica fibers Refrasil, a substantially increased improvement in ablative effectiveness was observed as indicated for the Q* values of Compositions O, P, R and S. Thus, in Composition O with 3.6% Refrasil and no asbestos, the ablative effectiveness value was about 5,600; with 5% Refrasil, 6,900, as seen for Composition P; with 10% Refrasil, 9,700, as seen for Composition R; and with 15% Refrasil, 17,000, as noted for Composition S.

From the results noted and described above, it is seen that the incorporation of silica fibers, particularly the high silica fibers marketed as Refrasil, provide substantially improved ablative effectiveness when employed in the resin compositions containing a boron compound such as ammonium borate, according to the invention.

EXAMPLE 5

Results similar to those of Example 4 are obtained employing in place of the epoxy resin system of Compositions L to S, a phenolic resin, and an epoxy-novolac resin system, respectively.

EXAMPLE 6

Boron oxide ($B_2O_3$) was added to Refrasil ¼ inch fibers in a proportion of 100 parts Refrasil to 10 parts boron oxide. Such mixture was then added to a mixture of 76% epoxy-polyamide resin of the type described in Example 4 above, 12% ammonium borate trihydrate and 12% phosphate fire retardant, in the proportion of 15 parts of the boron oxide-Refrasil mixture to 85 parts of the resin-containing mixture. Such composition was applied to a steel plate or substrate as described above, the epoxy resin cured at ambient temperature, and the resulting cured coating subjected to ablation conditions as described above for a period of about 12 seconds. A high ablative effectiveness value according to the invention was obtained.

EXAMPLE 7

A mixture of 84 parts of the resin-containing mixture noted in Example 6 above and containing 76% epoxy-polyamide resin component, 12% ammonium borate trihydrate and 12% phosphate fire retardant, and 13 parts Refrasil ¼ inch fibers and 3 parts S-994 glass (aluminum and magnesium silicate) fibers was formed, and the resulting mixture applied to a substrate as described above, cured, and the resulting cured coating subjected to ablation conditions as noted above for about 12 seconds. A high ablative effectiveness value according to the invention was obtained.

EXAMPLE 8

A mixture of 85 parts of the resin-containing mixture noted in Example 6 and containing 76% epoxy-polyamide, 12% ammonium borate trihydrate and 12% phosphate fire retardant, and 13 parts Refrasil ¼ inch fibers and 2 parts of silica microballoons (borosilica) was prepared. Such mixture was applied to a steel substrate as described above, the coating cured and then subjected to ablation conditions for 12 seconds as described above. An ablative effectiveness value Q* of 10,000 was obtained.

From the foregoing, it is seen that the invention provides improved ablative compositions which are resistant to ablation conditions and high temperatures, providing an effective insulation and protective medium for the surfaces of objects, particularly those employed under supersonic flight conditions.

While I have described particular embodiments of my invention for the purpose of illustration within the spirit of the invention, it will be understood that the invention is not to be taken as limited, except by the scope of the appended claims.

I claim:

1. An ablation coating composition comprising from about 15% to about 95% of an epoxy resin, from about 5% to about 75% of silica in fibrous form, and about 1% to about 10% of a boron and oxygen-containing compound calculated as boron oxide, said compound selected from the group consisting of boron oxide, borates and boric acid, by weight.

2. An ablation coating composition as defined in claim 1, said composition including a curing agent for said resin.

3. An ablation coating composition as defined in claim 1, said epoxy resin being an epoxy-polyamide resin.

4. An ablation coating composition as defined in claim 1, said epoxy being the diglycidyl ether of bisphenol A.

5. An ablation coating composition as defined in claim 1, wherein said silica is a leached high silica fiberglass.

6. An ablation coating composition as defined in claim 1, wherein said silica is a leached high silica fiberglass and said boron and oxygen-containing compound is ammonium borate.

7. An ablation coating composition as defined in claim 1, said epoxy being the condensation product of bisphenol A and epichlorhydrin, said silica being a leached high silica fiberglass.

8. An ablation coating composition as defined in claim 1, said epoxy resin being present in an amount of about 25% to about 75%, by weight.

9. An ablation coating composition as defined in claim 8, said epoxy resin being an epoxy-polyamide resin, said epoxy being the condensation product of bisphenol A and epichlorhydrin, said silica being a leached high silica fiberglass.

10. An ablation coating composition as defined in claim 1, said composition being substantially alkali-free.

11. An article including a substrate containing an ablation coating consisting essentially of a cured resinous composition as defined in claim 1.

12. An article including a substrate containing an ablation coating consisting essentially of a cured resinous composition as defined in claim 6.

13. An ablation coating composition as defined in claim 1, said composition including an ammonium phosphate in an amount ranging from about 5 to about 25% by weight.

* * * * *